US012608461B2

(12) United States Patent
Koenig et al.

(10) Patent No.: US 12,608,461 B2
(45) Date of Patent: Apr. 21, 2026

(54) MITIGATION OF RISK OF DENIAL OF SERVICES FOR PROTECTED RESOURCES

(71) Applicant: SAP SE, Walldorf (DE)

(72) Inventors: Steffen Koenig, Heidelberg (DE); Tobias Dyrba, Edingen-Neckarhausen (DE)

(73) Assignee: SAP SE, Walldorf (DE)

( * ) Notice: Subject to any disclaimer, the term of this patent is extended or adjusted under 35 U.S.C. 154(b) by 137 days.

(21) Appl. No.: 18/519,236

(22) Filed: Nov. 27, 2023

(65) Prior Publication Data

US 2025/0173422 A1 May 29, 2025

(51) Int. Cl.
G06F 21/45 (2013.01)
G06F 21/00 (2013.01)

(52) U.S. Cl.
CPC .................................. G06F 21/45 (2013.01)

(58) Field of Classification Search
CPC .......... G06F 21/45; G06F 21/30; G06F 21/31; G06F 21/34; G06F 21/41; G06F 21/44; G06F 21/46; G06F 21/604
See application file for complete search history.

(56) References Cited

U.S. PATENT DOCUMENTS

| | | | |
|---|---|---|---|
| 2018/0322275 A1* | 11/2018 | Li | ........................... G06F 21/554 |
| 2020/0213334 A1* | 7/2020 | Kutner | ................ H04L 63/1416 |
| 2023/0299968 A1 | 9/2023 | Dyrba et al. | |

* cited by examiner

*Primary Examiner* — Edward Zee
(74) *Attorney, Agent, or Firm* — Fish & Richardson P.C.

(57) ABSTRACT

The present disclosure relates to computer-implemented methods, software, and systems for mitigating risk of denial of services for protected resources, including: receiving a request to change an old log-in credential of an account for authenticating to access a resource to a new log-in credential, wherein the request is received from an entity authenticated at an automation tool that is configured to execute resource management operations over resources; determining, at the automation tool, whether to validate the new log-in credential by determining whether a tracked number of attempts to access the resource by the account has reached a threshold lock policy value for the resource; and in response to invalidating the new log-in credential by determining that the tracked number of attempts to access the resource exceeds the threshold lock policy value, denying, by the automation tool, changing the old log-in credential to the new log-in credential.

20 Claims, 5 Drawing Sheets

MITIGATION OF RISK OF DENIAL OF SERVICES FOR PROTECTED RESOURCES

TECHNICAL FIELD

The present disclosure relates to computer-implemented methods, software, and systems for secure data processing.

BACKGROUND

Software applications can provide services and access resources. Resources may be restricted to a limited number of users based on user rights and roles. Tokens, credentials, keys or other means can be used to authenticate requests to gain access to restricted resources. When a user requests access to a resource, the user may be validated to determine whether the user is authorized to access the resource.

SUMMARY

The present disclosure involves systems, software, and computer implemented methods for mitigating risk of denial of services for protected resources due to attempts to access a resource with an incorrect credential multiple times that can lead to locking of the resource.

One example method may include operations such as: receiving, at an automation tool, a request to change an old log-in credential of an account for authenticating to access a resource to a new log-in credential, wherein the request is received from an entity authenticated at the automation tool, and wherein the automation tool is configured to execute resource management operations over resources comprising the resource, the resources being provided at a data center; determining, at the automation tool, whether to validate the new log-in credential by determining whether a tracked number of attempts to access the resource by the account has reached a threshold lock policy value for the resource; and in response to invalidating the new log-in credential by determining that the tracked number of attempts to access the resource exceeds the threshold lock policy value, denying, by the automation tool, changing the old log-in credential to the new log-in credential.

In some instances, the entity can be a user associated with the account. The account is associated with the data center and with the user, and the account is usable for accessing resources at the data center. In some instances, the entity is an application associated with the account, and the account is usable for authenticating to access resources at the data center based on a current version of stored log-in credential.

In some instances, the method can include: in response to determining that the tracked number of attempts to access the resource is below the threshold lock policy value, sending a request to access the resource based on the new log-in credential to validate the new log-in credential, and in response to receiving access to the resource based on the new log-in credential, updating the new log-in credential as a current valid credential for the account for accessing resources at a storage comprising the resource.

In some instances, the account can be configured at the automation tool. In some instances, the method can include: storing information for a log-on policy for accessing resources at the data center, wherein the storing comprises: obtaining the threshold lock policy value associated with the resource.

In some instances, the method can include: tracking, at the automated tool, the number of attempts to access the resource based on provided credentials from entities authenticated at the automated tool. In some instances, the method can include retrieving a log-on policy associated with the resource, the log-on policy comprising the threshold lock policy value.

In some instances, the method can include that in response to determining that the tracked number of attempts to access the resource is below the threshold lock policy value, a request to access the resource is sent based on the new log-in credential to validate the new log-in credential, and that in response to receiving a notification for denied access to the resource based on the new log-in credential, the tracked number of attempts to access the resource is updated by increasing with one to generate an updated tracked number of attempts to be used for subsequent determinations to validate requests for changes of credentials of the account.

Similar operations and processes may be performed in a system comprising at least one processor and a memory communicatively coupled to the at least one processor where the memory stores instructions that when executed cause the at least one processor to perform the operations. Further, a non-transitory computer-readable medium storing instructions which, when executed, cause at least one processor to perform the operations may also be contemplated. In other words, while generally described as computer implemented software embodied on tangible, non-transitory media that processes and transforms the respective data, some or all of the aspects may be computer implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description, the drawings, and the claims.

DETAILED DESCRIPTION

Figure 1:
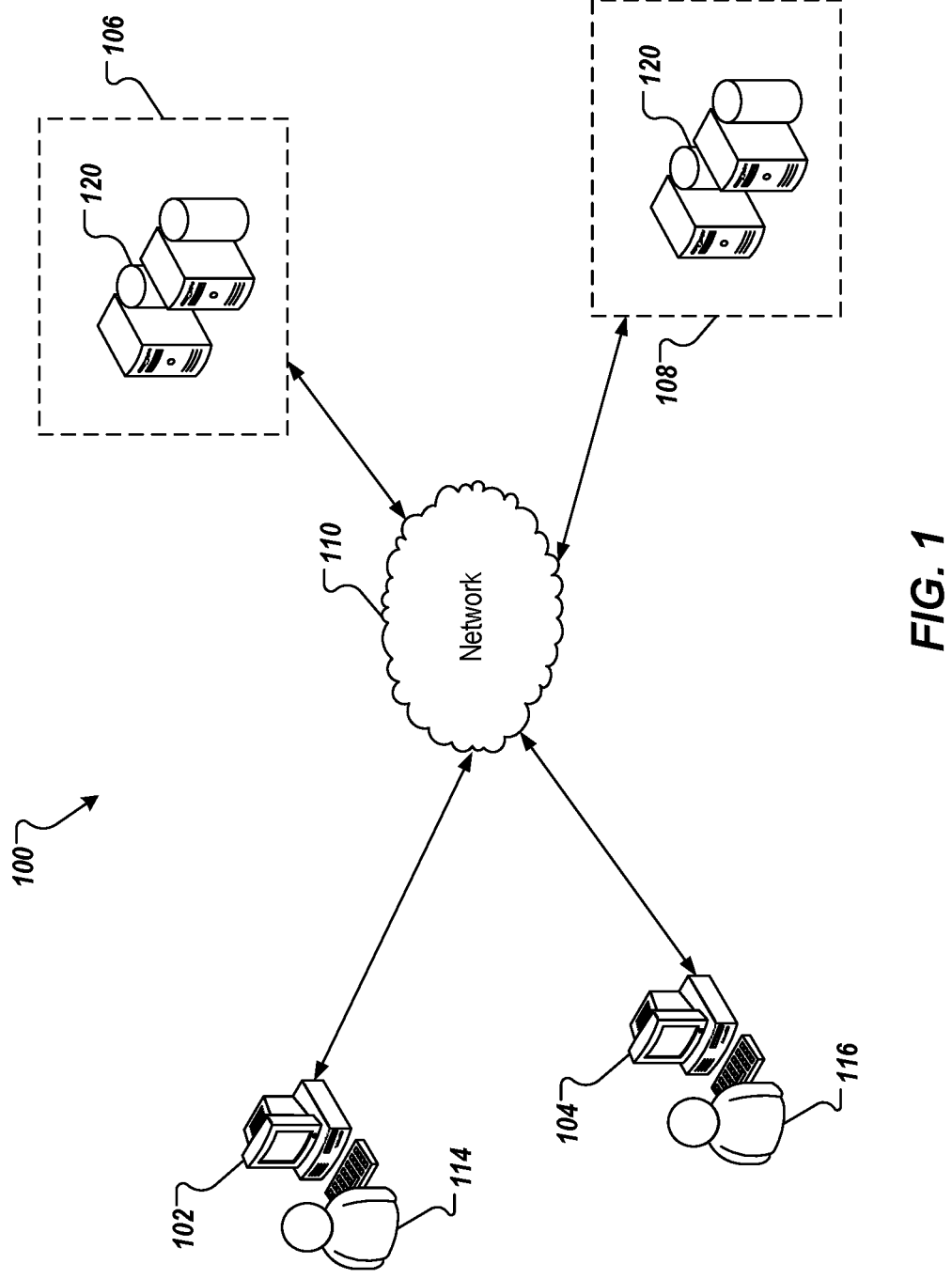
FIG. 1 illustrates an example computer system architecture for managing credential managing requests in accordance with the implementations of the present disclosure.

The present disclosure describes various tools and techniques for mitigating a risk of denial of services due to a malicious attack providing an invalid credential.

In some instances, an application can communicate with servers or data centers and request resources. The communication between the application and the servers or data centers can be a secure communication where the application authenticates at a server or data center, for example, by providing identity data of the requestor (e.g., a user or a client application, among others).

In some instance, an automation tool can be delegated actions to manage resources that are used by the application. For example, the application can provide services to end-users or customer entities based on accessing resources from a data center, and the application can delegate to the automation tool the management of these resources. In some instances, management of resources can include operations that are related to the lifecycle of the resources. The management of resources can include lifecycle operations including data replication, backup, update and upgrade operations, or data clean (e.g., removing files based on a criterion, e.g., outdated), among other example operations that can be delegated.

In some instance, the automation tool can be configured with access rights to execute delegated actions to manage resources. The automation tool can receive instructions for performing the actions and/or information about accessing the resources from a requestor. The requestor can be associated with the application delegating the actions can be, for example, a user, the application, a service, among other examples.

In some instances, the automation tool can be configured with defined flows based on requests for managing resources. In some cases, the configured flows can be procedures including actions that are to be executed over a schedule, e.g., every day, every month, upon receipt of a notification, event-based, or based on subscriptions, among other examples of time, cause, or other types of schedules. In some instances, the automation tool can be set up with accounts (e.g., relevant for different configured flows for execution), where different accounts can be relevant for different entities. In some instances, a set of resources can be accessible from a single account and using same credentials. In some instances, the automation tool can be provided with credentials for executing actions to and/or with the resources. For example, the credentials can be provided by a privileged user defined at the automation tool and associated with the requesting application for the action execution.

In some instances, credentials required for authentication to execute an action on or with a resource (e.g., an action to manage the resource) may be rotated or updated within a resource. In some instances, the rotation of the credentials can be performed to improve the protection of the resources and to lower the risk of fraudulent requests to the resources if a credential is leaked. In some instances, the resource can be defined with a log-on policy including rules for locking out accounts that attempt to access the resource multiple times with invalid credentials. For example, if an entity attempts to use more than a few unsuccessful passwords while trying to log on to a system providing the resource might be a malicious entity that is attempting to determine an account password by trial and error. In some instances, if multiple unsuccessful attempts are made, the account used for accessing may be disabled for a preset period of time. In some instances, a log-on policy can define a threshold for disabling the access to the resource and/or actions that can be taken after the threshold is reached.

In such case, the automation tool can be provided with updates to the current valid credentials for authentication. For example, such update can be received when the credentials for the resource are changed. Thus, after a credential rotation is executed for the resource, the automation tool can be updated with the new credentials so that the tool can continue accessing the resources by validly authenticating with the new credentials. In some instances, the update for the new credentials at the automation tool can be performed by a privileged user defined at the tool and associated with the resource and also, optionally, with the application or service associated with actions of the automation tool to manage the resource. In some instances, rather than a privileged user, the update of the credentials can be performed through other means for providing the new credentials, including through an application or service, or through a push notification from a server hosting the resource, among other example means. In some instances, the credentials that are used for authentication can be any means to authenticate towards the resource such as username and password, tokens, biometric credentials, keys, else.

In some instances, an entity that can be validly authenticated at the tool (e.g., a user or an application that is authenticated with a name and a password, tokens, or keys at the tool) can request to change credentials used for authentication towards managed resources at the tool to invalid credentials. In some cases, such entity can purposefully provide the invalid credentials in an attempt to lock the tool's access to the resource, since the tool would use the credentials several times and too many failed authentication requests can activate the locking of the resource (e.g., based on the log-on policy of the resource). In some other cases, the entity can provide the invalid credentials unknowingly that those are wrong credentials, however, this can still result in locking of the account used to access the resource with the invalid credentials. The locking of the account can affect the access to the particular resource as well as other resources whose access is based on the same account.

In some instances, if an automation tool is provided with a new credential that is not a valid one, the tool may attempt to execute functionality related to the resource and authenticate with the invalid credentials. If the authentication fails multiple times, this can lead to the resource being locked from the tool. The log-on policy for the resource may be unknown to the automation tool and in such case, the tool may not be aware of the limit to try to authenticate with the provided credentials before risking the account to be locked. If the account becomes locked, even if the automatic tool obtains new credentials that are valid, the account may be unusable for a period of time corresponding to the log-on policy of the resource. In some cases, that can lead to failed service execution by the automation tool since during the locked period no actions from the tool can be performed based on the locked account. This can affect the performance of the tool when executing other actions for other resource relying on the same account.

In accordance with implementations of the present disclosure, the automation tool can be configured with logic to process requests for changing credentials by internally validating the requests based on stored information for log-on policies for resources. For example, the automation tool may obtain and store information about the log-on policies for resource A, which may define that on the third unsuccessful attempt to authenticate, the access to the resource would be locked for the tool. Based on such information, when the tool is provided with new credentials, the tool may check how many times the new credentials have been used without successful authentication and compare it with a number of allowed attempts that would not lead to locking the resource even if the credentials are wrong (e.g., in this case two (2)). This check can be performed at the tool without actually performing an authentication at the resource that could lead to locking.

In some instances, when a new credential is received to update an old one, the new credential can be compared with a number of unsuccessful authentications that are tracked for the account. For example, the tracked number of unsuccessful authentications can be tracked and evaluated in a substantially similar manner to the tracking of requests for authentication received at the resource. In some instances, the tracked number of unsuccessful authentication requests can be tracked within a predetermined period of time (e.g., as defined in the log-on policy), so that a time gap between any two of the requests would not exceed a period of time for restarting the counter for tracking the number of requests for authentication. Such time gap can be defined in the log-on policy and can be used by the resource when authenticating requests and such behavior can be mimicked at the tool.

In some cases, a counter tracking attempts to authenticate without success can be maintained in a way that the counter will be moved to zero if a threshold period of time after a latest unsuccessful authentication request has lapsed. In some cases, the counter is restarted when the number of attempts reached the limit, and the resource is locked. In some more cases, a hard reset can be performed for the counter, for example, based on external input. For example, if at 1500 pm CET, there was an unsuccessful attempt to authenticate and the defined time gap between requests to restart (or reset) the counter is 15 minutes, if there is an unsuccessful request at 1501 pm CET, the automatic tool can increase the counter for the unsuccessful attempts with one, and if by 1516 pm CET there is no other attempt to authenticate, the counter may be moved to zero (0). In this example, the log-on policy defines a period of 15 minutes as a time gap between attempts that if exceeded, restarts or resets the counter. In such way, occurrences of authentication with a time gap higher than the threshold value (e.g., 15 minutes) may be considered as not correlated with each other and be considered separately (within the context of separate tracking of successive unsuccessful requests).

FIG. 1 depicts an example architecture 100 in accordance with implementations of the present disclosure. In the depicted example, the example architecture 100 includes a client device 102, a client device 104, a network 110, an environment 106, and an environment 108. The environment 106 and the environment 108 may be cloud environment. The environment 106 and the environment 108 may include corresponding one or more server devices and databases (e.g., processors, memory). In the depicted example, a user 114 interacts with the client device 102, and a user 116 interacts with the client device 104.

In some examples, the client device 102 and/or the client device 104 can communicate with the environment 106 and/or environment 108 over the network 110. The client device 102 can include any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In some implementations, the network 110 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, the environment 106 includes at least one server and at least one data store 120. In the example of FIG. 1, the environment 106 is intended to represent various forms of servers including, but not limited to a web server, an application server, a proxy server, a network server, and/or a server pool. In general, server systems accept requests for application services and provides such services to any number of client devices (e.g., the client device 102 over the network 110) and other service requests, as appropriate.

In some instances, the environments 106 and 108 may host one or more client applications, application servers, and authorization servers to support execution of secure requests between the client applications and the application server. In some instances, the user 114 or 116 may access a client application through the network 110. The client application may be communicatively coupled with an application server. The application server may include application logic implemented to provide services and resources to end users.

In some instances, the environments 106 and 108 may host an automation tool as previously discussed that is configured to execute actions (e.g., as part of implemented functionality of the automation tool). The automation tool can be set up to automate processes to be executed at a resource, where the resource may be provided by another entity such as a data center, application server, storage, service, application, or other. In some instances, the automation tool can be provided with access credentials to access a resource and execute an action based on the credentials. In some instances, the credentials provided to the tool for accessing one resource may also be valid for accessing another resource, for example, access based on the same account with the credentials. Each of the resources may have a log-on policy to process requests for authentication and to determine when to lock access to the resource in case of unsuccessful authentication with invalid credentials. In some cases, some or all of the resource can be associated with the same log-on policy, or there can be a specific configuration of the log-on policy defined for each resource. In some instances, the log-on policy can define a number of unsuccessful requests to authenticate that are allowed before the account requesting the authentication be locked out. In some instances, the log-on policy also can define a time gap between requests that if exceeded, the requests can be treated as separated not-correlated instances. In some instances, the log-on policy can define a period of time after a lock event for which the account would stay locked and no attempts for authentication would be allowed during that period of time.

In some implementations, the automation tool can be configured with logic to locally store information about log-on policies of the resources that are associated with the configured access for automatic execution by the automation tool. The automation tool can internally validate whether a next request to connect with a resource should be send to the resource. In some instances, the automation tool can internally determine whether the attempt, if based on invalid credentials, will lock the tool for accessing resources by determining whether the attempt if executed with invalid credentials would lock the resource based on the log-on policy. In some instances, when the automation tool receives a new credential to replace an old credential for accessing a resource, the tool can determine that the number of times that the new credential was tried out and the number of times had reached a threshold that would not lead to locking of the access to the resource. For example, one attempt has been tracked as unsuccessful and the access to the resources would be locked at three unsuccessful attempts, thus, one more attempt can be made that even if unsuccessful that would not lead to locking. In such case, the automation tool can invalidate the request to access the resource based on the provided new credential and deny changing the credential with the newly provided one. For example, if two attempt have been tracked and with three unsuccessful attempts the account can be locked, thus, the third attempt would not be allowed as it is associated with a risk of locking the account.

Figure 2:
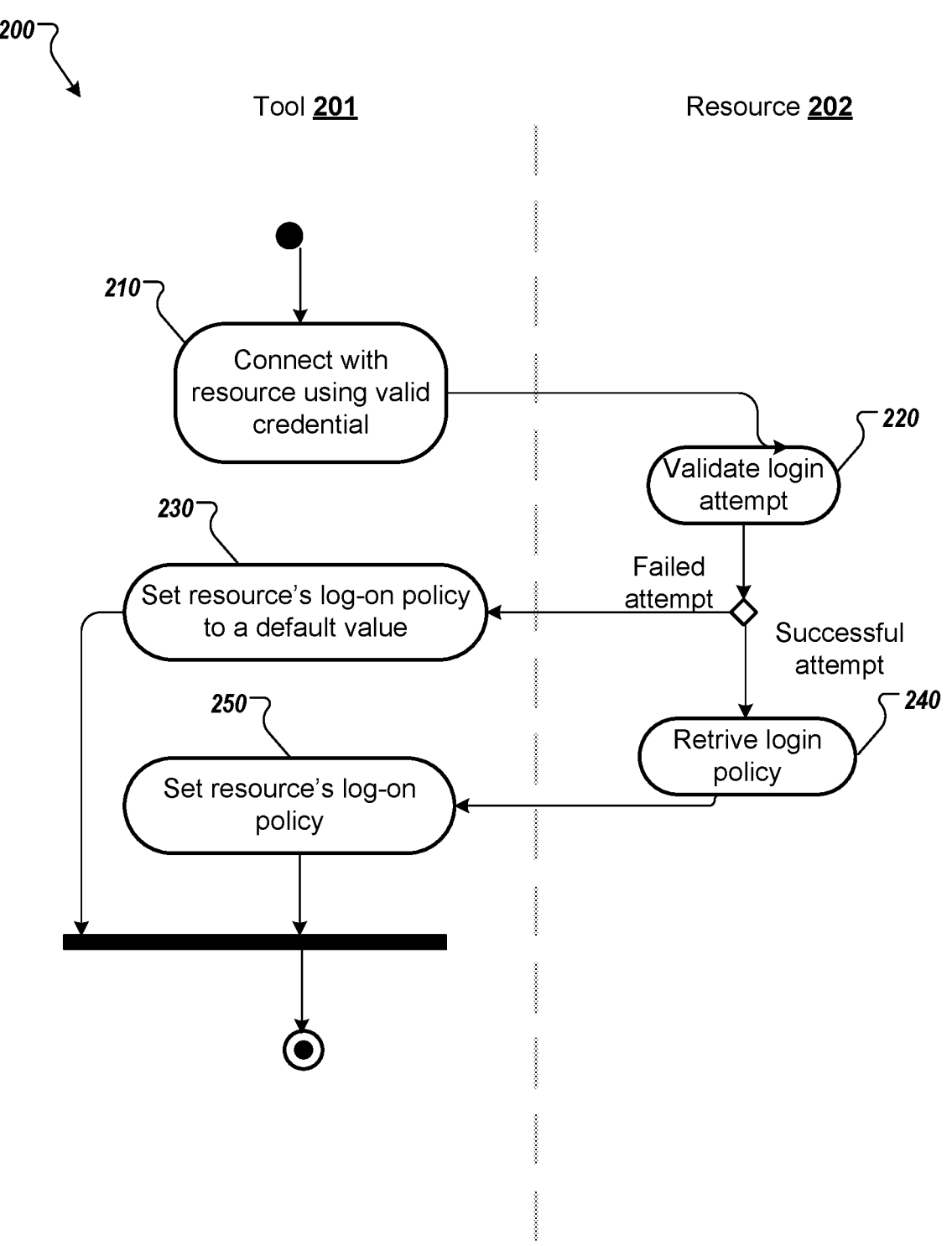
FIG. 2 is a block diagram for an example method for configuring a log-on policy of a resource at an automation tool configured to manage resources in accordance with implementations of the present disclosure.

FIG. 2 is a block diagram for an example method 200 for configuring a log-on policy of a resource at an automation tool 201 configured to manage resources in accordance with implementations of the present disclosure. In some instances, the method can be executed in the context of executing a request by the automation tool 201 at a resource 202 as part of a configured process for managing the resource 202 as described throughout the application and at FIGS. 1, 3, and 4.

In some instances, the resource 202 can be stored at a data center together with other resources that can be managed by the automation tool 201. For example, the management of resources can include at least one of resource updates, resource upgrades, resource replication, or resource deletion, among other examples.

In some instances, automation tool 201 can be configured to executed preconfigured flows related to managing the resource 202. In some implementations, the preconfigured flow(s) can be defined for automatic execution of series of actions. In some instances, the preconfigured flow(s) can be defined based on requests received from an application, service, or another entity. In some instances, one account may be valid for some or all resources, or one account may be valid for a particular flow type, where multiple accounts may have access to execute operations related to the resource 202. In some implementations, the automation tool 201 can be configured based on received requests from external entities, including users, applications, services, or other software components. In some instances, to perform such automation tasks, the tool 201 can be provided with credentials that would allow access to the resources which the tool 201 is configured to manage. In some instances, actions defined in flows can be performed to manage resource and may be repetitive tasks that have to be executed according to an execution scheme defining periodicity or triggers for initiation of the flow's executions. For example, resources associated with an application may be backed-up according to a defined backup scheme defining a time schedule for execution of back-up operations. Such back-up of resources can be configured as tasks to be executed by the tool 201 according to a predefined flow of actions for performing the tasks. In such manner, the tool 201 can execute the back-up operations instead or in addition to the application. In some instances, an entity such as an application can delegate operations to be executed by the tool 201.

In some instances, the automation tool 201 can be configured with an account(s) associated with the preconfigured flow(s). One or more accounts can be configured at the automation tool 201 and can be provided with credentials for authenticating to execute operations at resources including resource 202.

In some instances, the tool 201 can be configured to execute a request to perform an operation (e.g., as a single operation or as part of a configured flow) related to the resource 202. The execution of the operation can be related to a configured task associated with an entity, such as an application or user. For example, the execution may be based on a scheduled job for execution an action defined at a preconfigured flow.

At 210, the tool 201 can connect with the resource 202 based on credential that are stored in the tool 201 for the resource. The tool 201 provides the credentials to authenticate for accessing the resource 202. The resource 202 validates the attempt of the tool 201 based on the provided credentials. If the log-in attempt (at 220) of the tool 201 at the resource 202 based on the provided credentials is unsuccessful (e.g., the provided credentials are not valid), the resource 202 can send a notification for the failed authentication.

At 230, the tool 201 can set up a counter to track a number of unsuccessful requests that are performed for the request. If the tool is aware of the log-on policy of the resource 202, the tool 201 can compare the counter number with the policy to determine whether to allow subsequent requests to access a resource. The comparison with the counter number can be performed in an attempt to minimize the risk of locking the access to the resource if the number of the unsuccessful requests could reach the log-on policy threshold value for allowed unsuccessful tried before locking the access.

If the validation of the log-in attempt at 220 is successful, then at 240, the log-on policy of the resource can be retrieved at 240, and information about the log-on policy of the resource can be provided to the tool 201. Based on the information for the log-on policy of the resource, the tool 201 can, at 250, set a value associated with the log-on policy of the resource. The value can define the number of allowed attempts to access the resource 202 based on invalid credentials (unsuccessful attempts) before the access to the resource 202 be denied. For example, the resource 202 can have a log-on policy that limits the number of unsuccessful attempts to access a resource from a given account before locking the resource for accessing with the same account to five (5). If the number of tracked unsuccessful attempts associated with an account is determined to be four (4) at the tool, a subsequent request to attempt to access the resource with the account may be denied in order to mitigate the risk of locking the account.

In some instances, the resource 202 can provide other information related to the log-on policy including the time gap between request for authentication that if exceeded causes subsequent requests to be considered separately and/or as unrelated to previous requests, so that the counter for tracked unsuccessful request would be restarted. In some instances and in the context of the example where the number of tracked attempts that is 4 and the log-on policy value is 5, the tool may allow to execute a subsequent request to access the resource after expiry of the time gap between the requests as obtained from the information related to the log-on policy of the resource.

Figure 3:
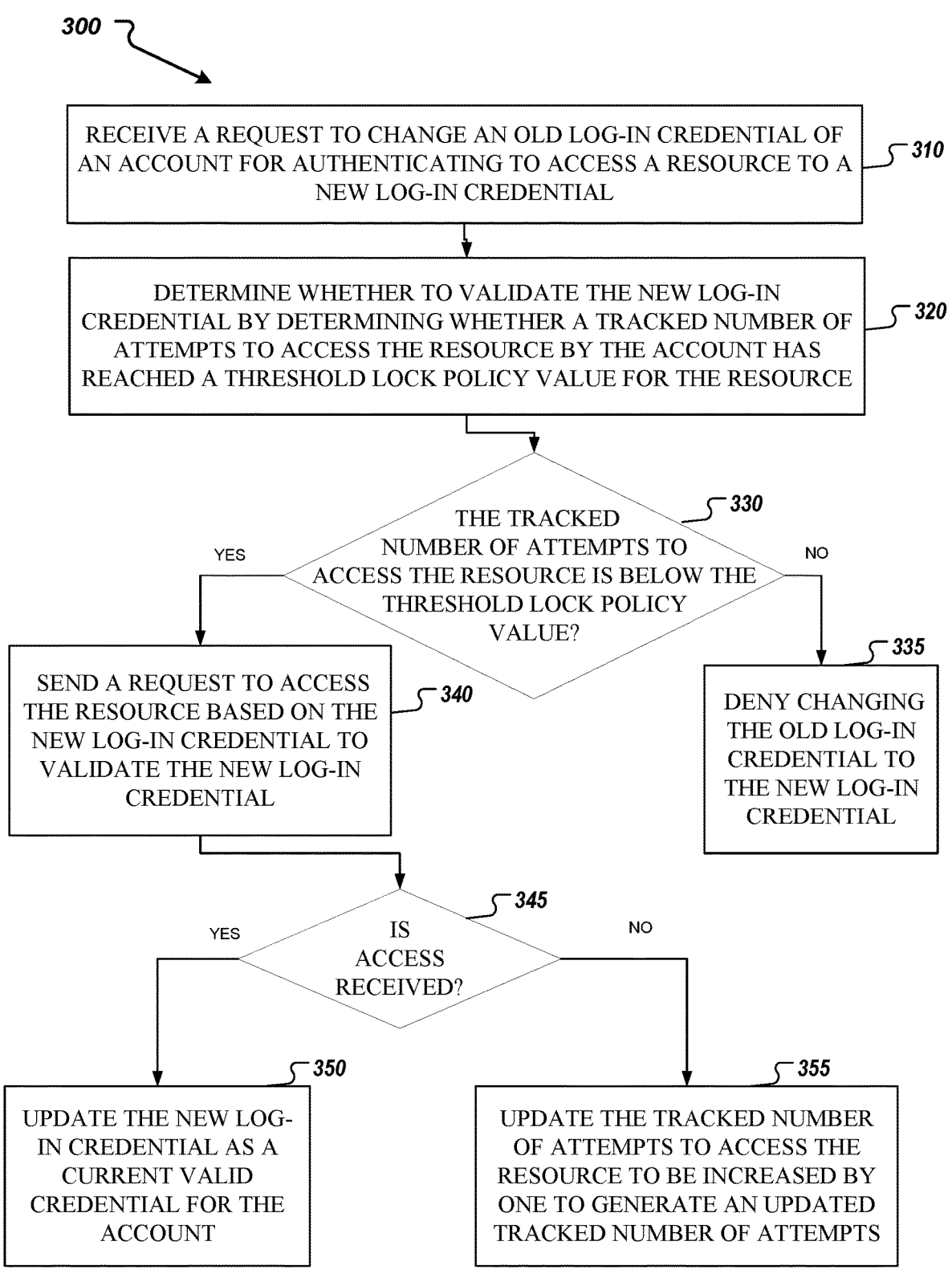
FIG. 3 is a flowchart for an example method for processing requests for updating credentials for accessing a resource in accordance with implementations of the present disclosure.

FIG. 3 is a flowchart for an example method 300 for processing requests for updating credentials for accessing a resource in accordance with implementations of the present disclosure. In some instances, the method 300 can be executed at an automation tool such as the previously discussed automation tool in relation to FIGS. 1 and 2.

At 310, a request to change an old log-in credential of an account for authenticating to access a resource to a new log-in credential is received. The request is received from an entity authenticated at the automation tool, for example, a user or an application that is authenticated at the automation tool and has access to request the execution of the change of credentials. In some instances, the automation tool is configured to execute resource management operations over resources comprising the resource. In some instances, the resources can be provided at a data center.

At 320, it is determined whether to validate the new log-in credentials by determining whether a tracked number of attempts to access the resource by the account has reached a threshold lock policy value for the resource. In some instances, the tracked number of attempts can be determined based on a counter established at the automation tool and can be based on input from the resource to be notified that the request to access is not authenticated (e.g., as described in relation to operation 230 of FIG. 2).

At 330, it is determined whether the tracked number of attempts to access the resource is below a threshold lock policy value. In some instances, the threshold lock policy value is a value associated with the log-on policy of the resource. In some instances, information about the log-on policy is obtained directly from the resource (as discussed in relation to FIG. 2) or through external means. For example, the resource log-on policy can be obtained from external entity to the tool that is responsible for configuring the log-on policy for the resource, an external entity that polls the information about the log-on policy from the resource and provides it to the automation tool, the application that is associated with the automated actions configured for execution at the automation tool for resources including the resource, other.

If it is determined that the tracked number of attempts is not below the threshold value, then the new log-in credential is invalidated at the tool by determining that the tracked number of attempts to access the resource exceeds the threshold lock policy value. And thus, at 335, the changing of the old log-in credential to the new log-in credential is denied.

If it is determined that the tracked number of attempts is below the threshold value, then the new log-on credentials are used at a sent request to access the resource at 340. The sent request is based on the new log-on credential to validate those at the resource. If the access to the resource is received, then, at 350 the new log-in credentials are updated as a current valid credential for the account. If the access the denied at 345, then the tracked number of attempts to access the resource is increased by one to generate an updated tracked number of attempts at 355. Even though in this case the access is denied, the account is not locked as the number of attempts to access the resource that would be allowed to be unsuccessful had not been exceeded.

With such a method 300, the risk of executing a request to access a resource based on unverified credential (verified at the resource by actually executing a successful attempt to access the resource) that could lead to locking the access to the resource is reduced. With the current method, a last allowed attempt to be performed before locking the account is not executed with a new log-in credential that is newly provided for replacing the old credential. In some instances, if the tracked number of attempts is equal to the threshold lock policy value at 330, then, the method can deny 335 and/or wait for a threshold period of time (e.g., as provided in the log-on policy) before attempting to access the resource (as in 340). The subsequent attempt to access the resource can be performed after checking the tracked number of attempts, which can be reevaluated iteratively based on new requests received and/or the information about the log-on policy and any possible resetting of the tracking after a particular event (e.g., threshold period of time has lapsed, hard reset of the tracked number, a request with the credential from another source with proof of validity of the new credential, or else as configured at the tool).

Figure 4:
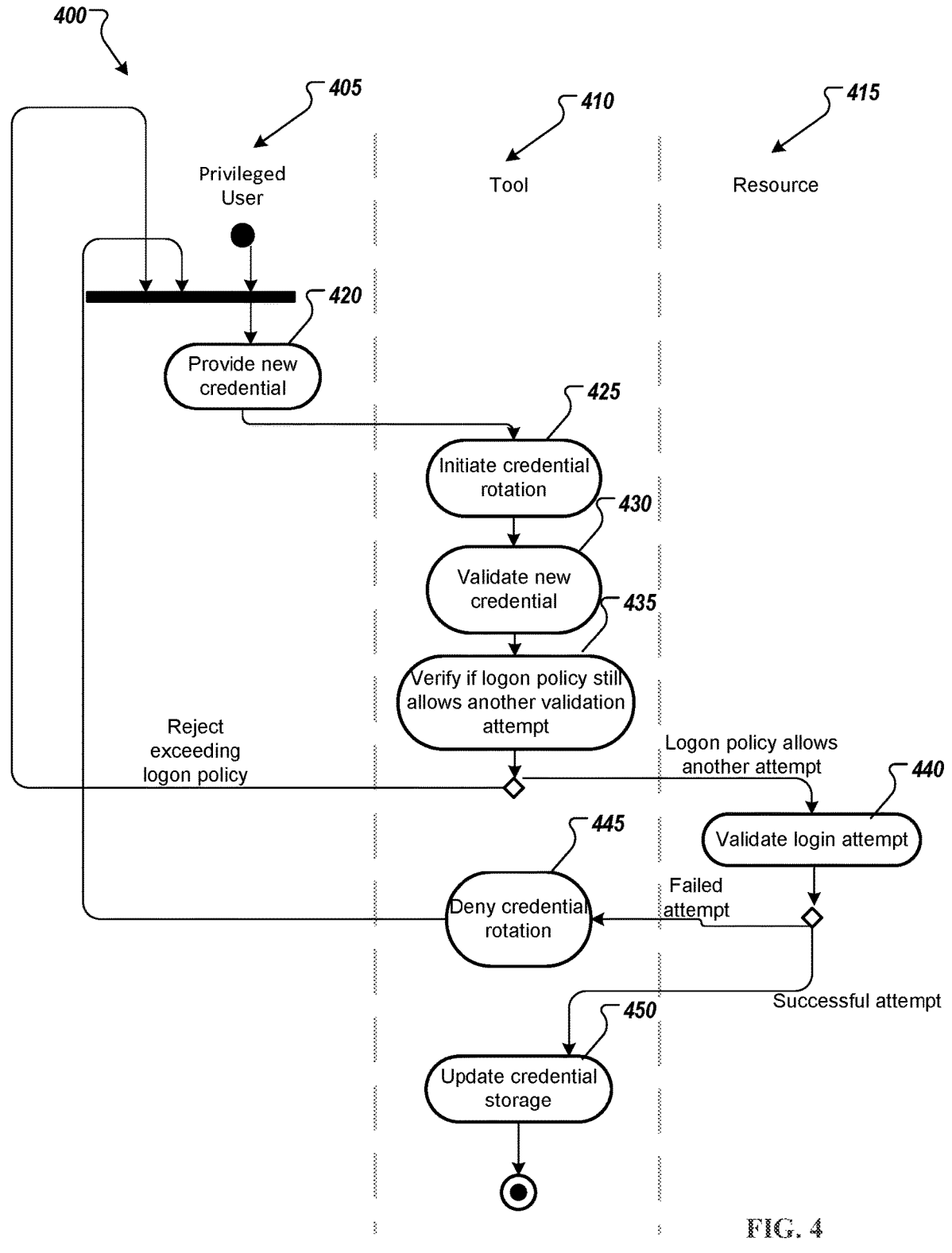
FIG. 4 is a flowchart for an example method for mitigating risks of locking an account for managing resources based on a fraudulent credential in accordance with implementations of the present disclosure.

FIG. 4 is a flowchart for an example method 400 for mitigating risks of locking an account for managing resources based on a fraudulent credential in accordance with implementations of the present disclosure. The method 400 can be executed in a context substantially similar to the context of method 300, where a tool 410 receives a request to change an old log-in credential with a new log-in credential. The tool 410 can be substantially similar to the tool 201 of FIG. 2 and the automation tool discussed in relation to FIG. 1 and FIG. 3.

A privileged user 405 who is authenticated at the tool 410, sends a request to initiate, at 425, a credential rotation, by providing a new credential (at 420). The new credential is to be used for authenticating with the resource 415. The resource 415 can be substantially similar to the resource 202 of FIG. 2 and the resource discussed in relation to FIGS. 1, 2, and 3.

At 430, the received new credential is validated at the tool. At 435, a log-on policy configured for the resource associated with the new credential is determined and it is verified if the log-on policy allows execution of a validation based on the new credentials. If the new credential is not a valid credential for the resource, an attempt to access the resource would result into locking the access to the resource 415. If it is determined that the log-on policy does not allow to perform one more attempt without risking the option that the resource 415 can be locked, the request to rotate the credentials is denied and the tool and the denial is provided as a notification to the privileged user 405.

If the log-on policy allows another validation attempt of the credentials as determined at 435, the tool 410 can provide, at 440, the credentials to request access to the resource 415. In such way, the resource validates the log-in attempt with the new credentials. If the validation at 440 fails, at 445, the resource provides a denial of rotation notification to the tool 410. The tool 410 can transfer the notification for the denial to the privileged user 405. If the validation at 440 is successful, at 450, the credentials are updated at the tool 410. The credentials can be updated by the tool 410 by storing the credentials as the current valid credentials at a storage.

Figure 5:
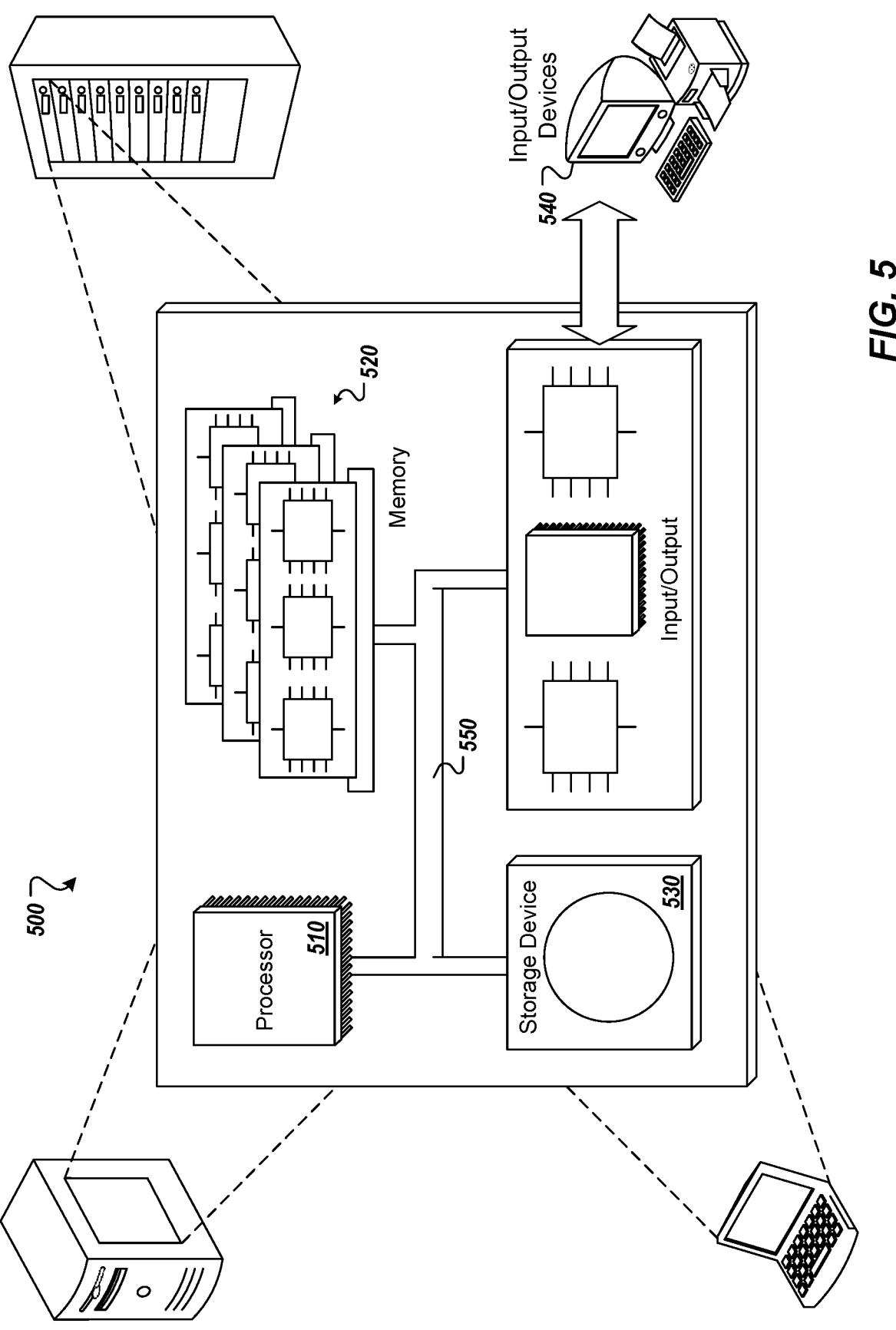
FIG. 5 is a schematic illustration of example computer systems that can be used to execute implementations of the present disclosure.

Referring now to FIG. 5, a schematic diagram of an example computing system 500 is provided. The system 500 can be used for the operations described in association with the implementations described herein. For example, the system 500 may be included in any or all of the server components discussed herein. The system 500 includes a processor 510, a memory 520, a storage device 530, and an input/output device 540. The components 510, 520, 530, 540 are interconnected using a system bus 550. The processor 510 is capable of processing instructions for execution within the system 500. In some implementations, the processor 510 is a single-threaded processor. In some implementations, the processor 510 is a multi-threaded processor. The processor 510 is capable of processing instructions stored in the memory 520 or on the storage device 530 to display graphical information for a user interface on the input/output device 540.

The memory 520 stores information within the system 500. In some implementations, the memory 520 is a computer-readable medium. In some implementations, the memory 520 is a volatile memory unit. In some implementations, the memory 520 is a non-volatile memory unit. The storage device 530 is capable of providing mass storage for the system 500. In some implementations, the storage device 530 is a computer-readable medium. In some implementations, the storage device 530 may be a floppy disk device, a hard disk device, an optical disk device, or a tape device. The input/output device 540 provides input/output operations for the system 500. In some implementations, the input/output device 540 includes a keyboard and/or pointing device. In some implementations, the input/output device 540 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method steps can be performed by a programmable processor executing a program of instructions to perform functions of the described implementations by operating on input data and generating output. The described features can be implemented advantageously in one or more computer programs that are executable on a programmable system, including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, application-specific integrated circuits (ASICs).

To provide for interaction with a user, the features can be implemented on a computer having a display device, such as a cathode ray tube (CRT) or liquid crystal display (LCD) monitor for displaying information to the user and a keyboard and a pointing device, such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication, such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

In view of the above described implementations of subject matter this application discloses the following list of examples, wherein one feature of an example in isolation or more than one feature of said example taken in combination and, optionally, in combination with one or more features of one or more further examples are further examples also falling within the disclosure of this application.

EXAMPLES

Example 1. A computer-implemented method comprising:

receiving, at an automation tool, a request to change an old log-in credential of an account for authenticating to access a resource to a new log-in credential, wherein the request is received from an entity authenticated at the automation tool, and wherein the automation tool is configured to execute resource management operations over resources comprising the resource, the resources being provided at a data center;

determining, at the automation tool, whether to validate the new log-in credential by determining whether a tracked number of attempts to access the resource by the account has reached a threshold lock policy value for the resource; and in response to invalidating the new log-in credential by determining that the tracked number of attempts to access the resource exceeds the threshold lock policy value, denying, by the automation tool, changing the old log-in credential to the new log-in credential.

Example 2. The method of Example 1, wherein the entity is a user associated with the account, wherein the account is associated with the data center and with the user, and wherein the account is usable for accessing resources at the data center.

Example 3. The method of any one of the preceding Examples, wherein the entity is an application associated with the account, and wherein the account is usable for authenticating to access resources at the data center based on a current version of stored log-in credential.

Example 4. The method of any one of the preceding Examples, comprising:

in response to determining that the tracked number of attempts to access the resource is below the threshold lock policy value, sending a request to access the resource based on the new log-in credential to validate the new log-in credential, and in response to receiving access to the resource based on the new log-in credential, updating the new log-in credential as a current valid credential for the account for accessing resources at a storage comprising the resource.

Example 5. The method of any one of the preceding Examples, wherein the account is configured at the automation tool, and wherein the method comprises:

storing information for a log-on policy for accessing resources at the data center, wherein the storing comprises:

obtaining the threshold lock policy value associated with the resource.

Example 6. The of any one of the preceding Examples, wherein the method comprises:

tracking, at the automated tool, the number of attempts to access the resource based on provided credentials from entities authenticated at the automated tool.

Example 7. The method of any one of the preceding Examples, comprising:

retrieving a log-on policy associated with the resource, the log-on policy comprising the threshold lock policy value.

Example 8. The method of any one of the preceding Examples, comprising:

in response to determining that the tracked number of attempts to access the resource is below the threshold lock policy value, sending a request to access the resource based on the new log-in credential to validate the new log-in credential, and in response to receiving a notification for denied access to the resource based on the new log-in credential, updating the tracked number of attempts to access the resource by increasing with one to generate an updated tracked number of attempts to be used for subsequent determinations to validate requests for changes of credentials of the account.

Example 9: A non-transitory computer-readable medium coupled to one or more processors and having instructions stored thereon which, when executed by the one or more processors, cause the one or more processors to perform operations according to any one of examples 1 to 8.

Example 10: A system comprising a computing device; and a computer-readable storage device coupled to the computing device and having instructions stored thereon which, when executed by the computing device, cause the computing device to perform operations according to any one of examples 1 to 8.

What is claimed is:

1. A computer-implemented method, the method comprising:

receiving, at an automation tool, a request to change an old log-in credential of an account to a new log-in credential for use in authenticating to access a resource of resources provided at a data center, wherein the request is received from an entity authenticated at the automation tool, and wherein the automation tool is configured to execute resource management operations over the resources;

determining, at the automation tool, whether to validate the new log-in credential by determining whether a tracked number of attempts to access the resource by the account has reached a threshold lock policy value for the resource; and in response to invalidating the new log-in credential by determining that the tracked number of attempts to access the resource exceeds the threshold lock policy value, denying, by the automation tool, changing the old log-in credential to the new log-in credential.

2. The method of claim 1, wherein the entity is a user associated with the account, wherein the account is associated with the data center and with the user, and wherein the account is usable for accessing resources at the data center.

3. The method of claim 1, wherein the entity is an application associated with the account, and wherein the account is usable for authenticating to access resources at the data center based on a current version of stored log-in credential.

4. The method of claim 1, comprising:

in response to determining that the tracked number of attempts to access the resource is below the threshold lock policy value, sending a request to access the resource based on the new log-in credential to validate the new log-in credential, and in response to receiving access to the resource based on the new log-in credential, updating the new log-in credential as a current valid credential for the account for accessing resources at a storage comprising the resource.

5. The method of claim 1, wherein the account is configured at the automation tool, and wherein the method comprises:

storing information for a log-on policy for accessing resources at the data center, wherein the storing comprises:

obtaining the threshold lock policy value associated with the resource.

6. The method of claim 1, wherein the method comprises:

tracking, at the automation tool, the tracked number of attempts to access the resource based on provided credentials from entities authenticated at the automation tool.

7. The method of claim 1, comprising:

retrieving a log-on policy associated with the resource, the log-on policy comprising the threshold lock policy value.

8. The method of claim 1, comprising:

in response to determining that the tracked number of attempts to access the resource is below the threshold lock policy value, sending a request to access the resource based on the new log-in credential to validate the new log-in credential, and in response to receiving a notification for denied access to the resource based on the new log-in credential, updating the tracked number of attempts to access the resource by increasing with one to generate an updated tracked number of attempts to be used for subsequent determinations to validate requests for changes of credentials of the account.

9. A non-transitory computer-readable medium coupled to one or more processors and having instructions stored thereon which, when executed by the one or more processors, cause the one or more processors to perform operations, the operations comprising:

receiving, at an automation tool, a request to change an old log-in credential of an account to a new log-in credential for use in authenticating to access a resource of resources provided at a data center, wherein the request is received from an entity authenticated at the automation tool, and wherein the automation tool is configured to execute resource management operations over the resources;

determining, at the automation tool, whether to validate the new log-in credential by determining whether a tracked number of attempts to access the resource by the account has reached a threshold lock policy value for the resource; and in response to invalidating the new log-in credential by determining that the tracked number of attempts to access the resource exceeds the threshold lock policy value, denying, by the automation tool, changing the old log-in credential to the new log-in credential.

10. The non-transitory computer-readable medium of claim 9, wherein the entity is a user associated with the account, wherein the account is associated with the data center and with the user, and wherein the account is usable for accessing resources at the data center.

11. The non-transitory computer-readable medium of claim 9, wherein the entity is an application associated with the account, and wherein the account is usable for authenticating to access resources at the data center based on a current version of stored log-in credential.

12. The non-transitory computer-readable medium of claim 9, wherein the operations further comprise:

in response to determining that the tracked number of attempts to access the resource is below the threshold lock policy value, sending a request to access the resource based on the new log-in credential to validate the new log-in credential, and in response to receiving access to the resource based on the new log-in credential, updating the new log-in credential as a current valid credential for the account for accessing resources at a storage comprising the resource.

13. The non-transitory computer-readable medium of claim 9, wherein the account is configured at the automation tool, and wherein the operations further comprise:

storing information for a log-on policy for accessing resources at the data center, wherein the storing comprises:

obtaining the threshold lock policy value associated with the resource.

14. The non-transitory computer-readable medium of claim 9, wherein the operations further comprise:

tracking, at the automation tool, the tracked number of attempts to access the resource based on provided credentials from entities authenticated at the automation tool.

15. The non-transitory computer-readable medium of claim 9, the operations further comprising:

retrieving a log-on policy associated with the resource, the log-on policy comprising the threshold lock policy value.

16. A system comprising a computing device; and a computer-readable storage device coupled to the computing device and having instructions stored thereon which, when executed by the computing device, cause the computing device to perform operations, the operations comprising:

receiving, at an automation tool, a request to change an old log-in credential of an account to a new log-in credential for use in authenticating to access a resource of resources provided at a data center, wherein the request is received from an entity authenticated at the automation tool, and wherein the automation tool is configured to execute resource management operations over the resources;

determining, at the automation tool, whether to validate the new log-in credential by determining whether a tracked number of attempts to access the resource by the account has reached a threshold lock policy value for the resource; and in response to invalidating the new log-in credential by determining that the tracked number of attempts to access the resource exceeds the threshold lock policy value, denying, by the automation tool, changing the old log-in credential to the new log-in credential.

17. The system of claim 16, wherein the entity is a user associated with the account, wherein the account is associated with the data center and with the user, and wherein the account is usable for accessing resources at the data center.

18. The system of claim 16, wherein the entity is an application associated with the account, and wherein the account is usable for authenticating to access resources at the data center based on a current version of stored log-in credential.

19. The system of claim 16, wherein the computer-readable storage device stores instructions, which when executed cause the computing device to perform operations comprising:

in response to determining that the tracked number of attempts to access the resource is below the threshold lock policy value, sending a request to access the resource based on the new log-in credential to validate the new log-in credential, and in response to receiving access to the resource based on the new log-in credential, updating the new log-in credential as a current valid credential for the account for accessing resources at a storage comprising the resource.

20. The system of claim 16, wherein the account is configured at the automation tool, and wherein the computer-readable storage device stores instructions, which when executed cause the computing device to perform operations comprising:

storing information for a log-on policy for accessing resources at the data center, wherein the storing comprises:

obtaining the threshold lock policy value associated with the resource.

* * * * *